(12) United States Patent
Tsukamoto et al.

(10) Patent No.: US 10,472,806 B2
(45) Date of Patent: Nov. 12, 2019

(54) DISPLAY SYSTEM

(71) Applicant: KOMATSU LTD., Minato-ku, Tokyo (JP)

(72) Inventors: Takashi Tsukamoto, Tokyo (JP); Etsuo Fujita, Tokyo (JP); Sueyoshi Nishimine, Tokyo (JP); Masahiro Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/758,047

(22) PCT Filed: Oct. 6, 2016

(86) PCT No.: PCT/JP2016/079834
§ 371 (c)(1),
(2) Date: Mar. 7, 2018

(87) PCT Pub. No.: WO2017/068993
PCT Pub. Date: Apr. 27, 2017

(65) Prior Publication Data
US 2018/0202131 A1    Jul. 19, 2018

(30) Foreign Application Priority Data

Oct. 23, 2015    (JP) .................................. 2015-208911

(51) Int. Cl.
*E02F 9/26*    (2006.01)
*B60R 1/00*    (2006.01)
(Continued)

(52) U.S. Cl.
CPC ................ *E02F 9/264* (2013.01); *B60R 1/00* (2013.01); *E02F 5/32* (2013.01); *E02F 9/261* (2013.01); *H04N 7/181* (2013.01); *B60R 2300/105* (2013.01); *B60R 2300/50* (2013.01); *B60Y 2200/22* (2013.01); *E02F 9/205* (2013.01)

(58) Field of Classification Search
CPC ... E02F 9/264; E02F 9/261; E02F 5/32; E02F 9/205; H04N 7/181; B60R 1/00; B60R 2300/50; B60R 2300/105; B60Y 2200/22
See application file for complete search history.

(56) References Cited

U.S. PATENT DOCUMENTS

2005/0189125 A1    9/2005  Matsumoto et al.
2005/0261799 A1*  11/2005  Groth ...................... E02F 3/435
                                                                  700/180
(Continued)

FOREIGN PATENT DOCUMENTS

JP    H11-217853 A    8/1999
JP    2005-171751 A    6/2005
(Continued)

*Primary Examiner* — Nam D Pham
(74) *Attorney, Agent, or Firm* — Drinker Biddle & Reath LLP (57) ABSTRACT

Provided is a display system capable of facilitating appropriate ripping work. A right ripper side camera images a ripping tip. The right ripper side camera is mounted on a vehicle main body. The image generating unit generates a display image. The display image includes an image of the ripping tip by an imaging unit and information about a rotative running of a crawler belt. A display unit displays the display image.

4 Claims, 7 Drawing Sheets

(51) Int. Cl.
*E02F 5/32* (2006.01)
*H04N 7/18* (2006.01)
*E02F 9/20* (2006.01)

(56) References Cited

U.S. PATENT DOCUMENTS

2011/0040458 A1    2/2011  Nakagawa et al.
2016/0217331 A1*   7/2016  Kowatari ................ E02F 9/261

FOREIGN PATENT DOCUMENTS

| | | |
|---|---|---|
| JP | 2008-95307 A | 4/2008 |
| JP | 2008-240362 A | 10/2008 |
| JP | 2012-107395 A | 6/2012 |
| WO | WO-2009/054270 A1 | 4/2009 |

* cited by examiner

DISPLAY SYSTEM

TECHNICAL FIELD

The present invention relates to a display system.

BACKGROUND ART

Heretofore, a crawler dozer has been proposed in which a blade is provided in a front portion of a vehicle body and a ripper apparatus for use in excavation of hard soil and soft stone is provided in a rear portion of the vehicle body (see, for example, Japanese Patent Laying-Open No. 2005-171751 (PTD 1)). In addition, heretofore, it has been proposed to provide a TV camera capable of imaging a ripper apparatus in an earthmoving machine including the ripper apparatus at the rear of the vehicle body (see, for example, Japanese Patent Laying-Open No. H11-217853 (PTD 2)).

CITATION LIST

Patent Document

PTD 1: Japanese Patent Laying-Open No. 2005-171751
PTD 2: Japanese Patent Laying-Open No. H11-217853

SUMMARY OF INVENTION

Technical Problem

In the second example of PTD 2, it is disclosed that each of a plurality of TV cameras arranged side by side in a left/right direction of the earthmoving machine images each of corresponding plurality of ripping tips. Each ripping tip is located behind the TV camera that images each ripping tip. Therefore, it has been impossible to accurately grasp a position of the ripping tip in a depth direction of the captured image, and it has been difficult to perform appropriate ripping work.

Meanwhile, an occurrence of running slip (track shoe slippage) of a crawler belt during the ripping work causes deterioration of fuel economy and wear of the crawler belt. For appropriate ripping work, it is desirable to operate an engine under conditions that do not cause the track shoe slippage, and it is desirable for an operator who performs the ripping work to be able to check the occurrence situation of the track shoe slippage. However, the above-mentioned PTDs 1 and 2 do not disclose such a technical idea.

It is an object of the present invention to provide a display system capable of facilitating appropriate ripping work.

Solution to Problem

A display system according to the present invention is a system for displaying information related to a work vehicle. The work vehicle includes: a travelling unit having a crawler belt; a vehicle main body installed on the travelling unit; and a ripper apparatus having a ripping tip and disposed behind the vehicle main body. The display system includes: an imaging unit, an image generating unit, and a display unit. The imaging unit images the ripping tip. The imaging unit is mounted on the vehicle main body. The image generating unit generates a display image. The display image includes an image of the ripping tip by the imaging unit and information about a rotative running of the crawler belt. The display unit displays the display image.

In the above-described display system, the imaging unit is disposed obliquely forward of the ripping tip to be imaged when viewed from above. The imaging unit simultaneously images the ripping tip and a part of the crawler belt.

In the above-described display system, the imaging unit is disposed at a position which does not overlap with the crawler belt when viewed from above.

In the above-described display system, the imaging unit is disposed within a width range of the crawler belt in the left/right direction of the vehicle main body.

In the above-described display system, the imaging unit is disposed above an upper end of the crawler belt.

Advantageous Effects of Invention

In accordance with the display system of the present invention, the appropriate ripping work can be performed with ease.

DESCRIPTION OF EMBODIMENTS

An embodiment of the present invention will be described hereinafter with reference to the drawings.

First, a configuration of a crawler dozer to which a display system according to an embodiment of the present invention is applicable will be described.

Figure 1:
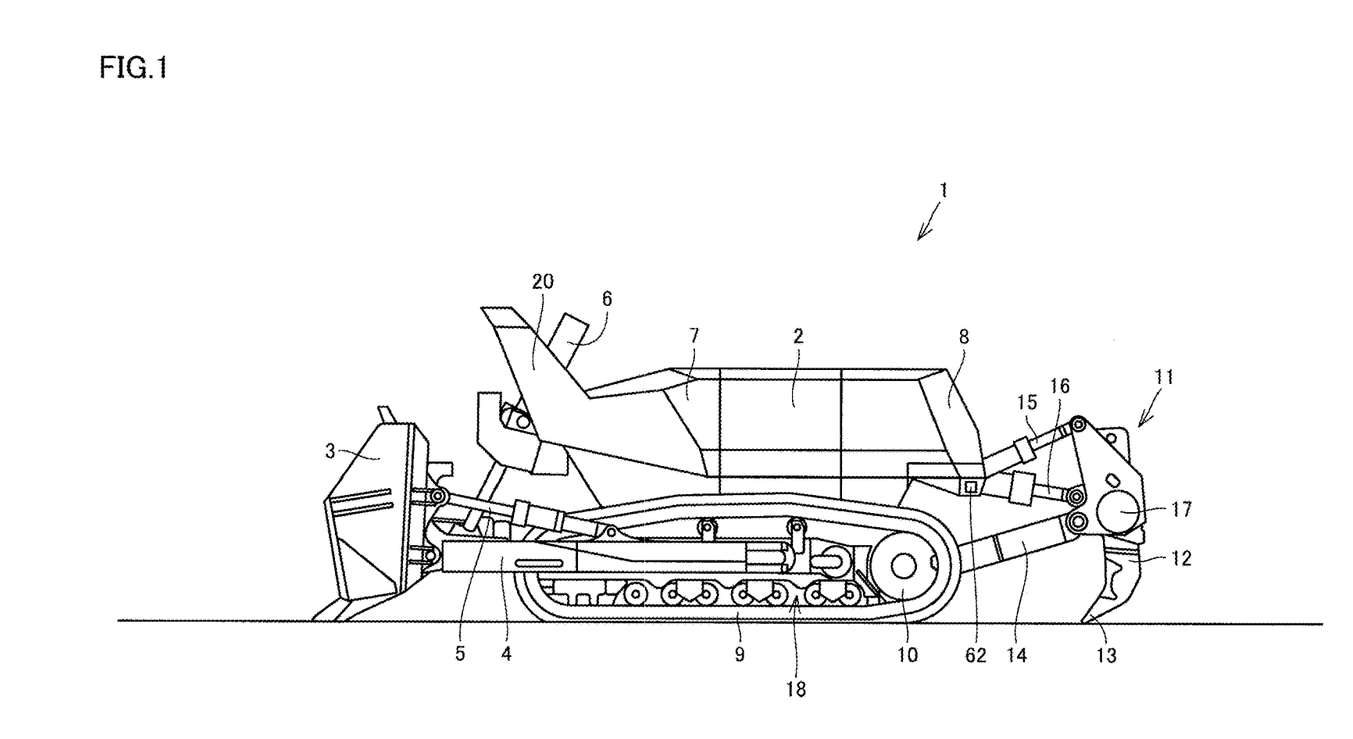
FIG. 1 is a side view schematically showing a construction of a crawler dozer in an embodiment of the present invention.
Figure 2:
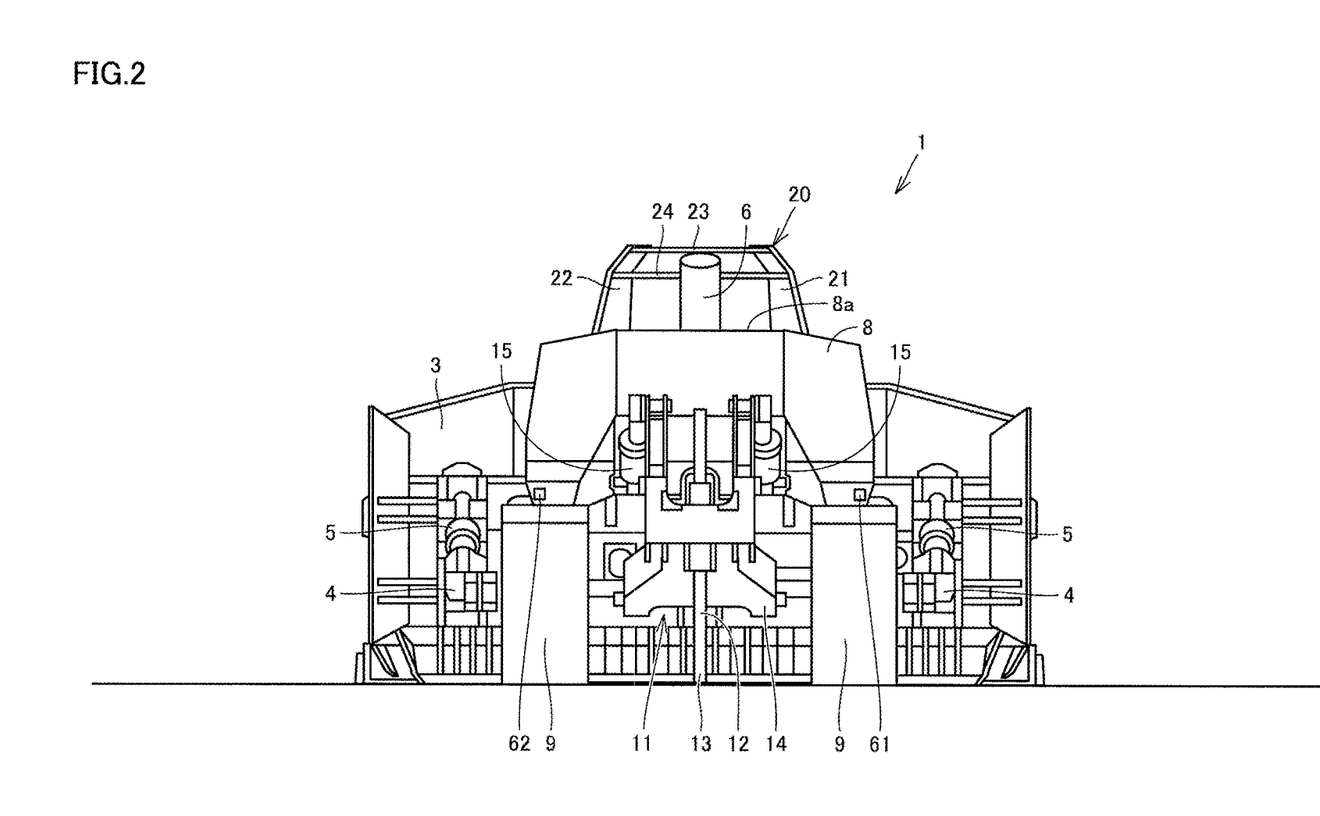
FIG. 2 is a rear view of the crawler dozer shown in FIG. 1.
Figure 3:
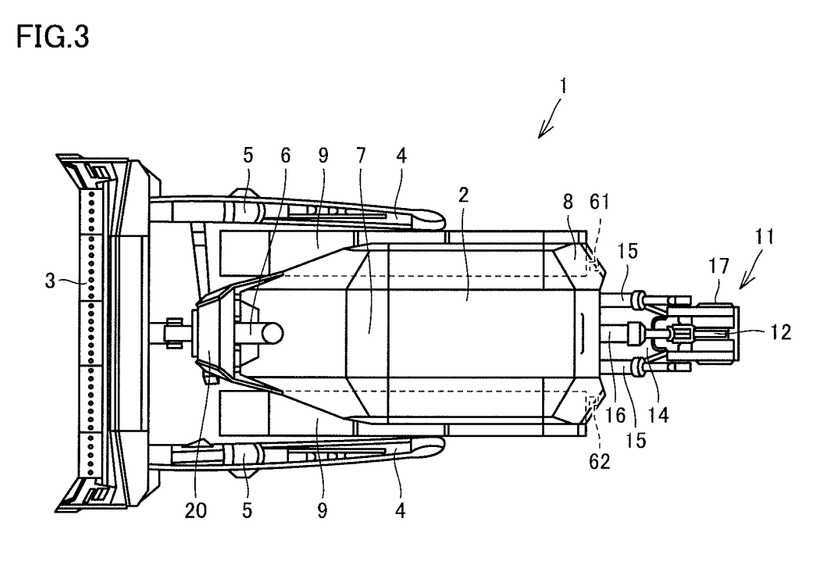
FIG. 3 is a plan view of the crawler dozer shown in FIG. 1.

FIG. 1 is a side view schematically showing a construction of a crawler dozer 1 in an embodiment of the present invention. FIG. 2 is a rear view of crawler dozer 1 shown in FIG. 1. FIG. 3 is a plan view of crawler dozer 1 shown in FIG. 1. Crawler dozer 1 shown in FIGS. 1 to 3 is a work vehicle dedicated to remote control. Crawler dozer 1 is controlled by a radio signal from a remote control device. Crawler dozer 1 does not include an operator's compartment for allowing an operator to get thereinto and to operate such a vehicle. Crawler dozer 1 does not carry an operating functionality to be used by the operator who gets thereinto.

As shown in FIG. 1, crawler dozer 1 includes a vehicle main body 2 and a travelling unit 18. Vehicle main body 2 is installed on travelling unit 18. As shown in FIG. 3, travelling unit 18 includes a pair of right and left crawler belts 9 separated in a vehicle width direction. Crawler belts 9 have an elliptical shape. Travelling unit 18 includes drive wheels 10. Crawler belts 9 are partially wound around outer circumferences of drive wheels 10. Crawler belts 9 are driven by rotation of drive wheels 10, and crawler dozer 1 travels.

Crawler dozer 1 includes an excavating blade 3 and a ripper apparatus 11. Excavating blade 3 is disposed at a front position of vehicle main body 2. Excavating blade 3 is a work implement for performing work such as soil excavation and land grading. Ripper apparatus 11 is disposed at a rear position of vehicle main body 2. Ripper apparatus 11 is a work implement for penetrating and crushing a hard material such as a rock.

Note that, in this embodiment, a direction in which crawler dozer 1 travels straight is referred to as a fore/aft direction of crawler dozer 1. In the fore/aft direction of crawler dozer 1, a side where excavating blade 3 protrudes from vehicle main body 2 is defined as a front direction. In the fore/aft direction of crawler dozer 1, a side where ripper apparatus 11 protrudes from vehicle main body 2 is defined as a rear direction. A left/right direction of crawler dozer 1 is a direction perpendicular to the fore/aft direction when viewed from above. A right side and a left side in the left/right direction when looking forward are a right direction and a left direction, respectively. A vertical direction of crawler dozer 1 is a direction perpendicular to a plane defined by the fore/aft direction and the left/right direction. A side on which the ground is present in the vertical direction is a lower side, and a side on which the sky is present is an upper side.

In crawler dozer 1, vehicle main body 2, which excludes excavating blade 3 as a front work implement; ripper apparatus 11 as a rear work implement, and travelling unit 18 as a track-type traveling apparatus, is formed into a shape that has no protrusion and is less likely to interfere with a periphery during work. An upper surface of vehicle main body 2 forms a substantially flat surface in the fore/aft direction and the left/right direction.

Excavating blade 3 is supported by frames 4 on both the left and right sides. Excavating blade 3 is driven by tilt cylinders 5 and a lift cylinder 6. Tilt cylinders 5 and lift cylinder 6 extend and contract in accordance with a command signal from a controller to be described later.

Excavating blade 3 is moved up and down by the extension and contraction of lift cylinder 6. A pitch angle of excavating blade 3 is changed by the extension and contraction of tilt cylinders 5. By changing the pitch angle, an inclination of excavating blade 3 with respect to the fore/aft direction changes. Note that the pitch angle of excavating blade 3 refers to an angle at which a cutting edge of excavating blade 3 is inclined with respect to a reference surface such as a perpendicular direction or a horizontal direction when crawler dozer 1 is viewed sideways.

Ripper apparatus 11 includes a shank 12. At a lower end of shank 12, a ripping tip 13 is provided. Ripping tip 13 penetrating a rock or the like, ripper apparatus 11 rips or crushes the rock by traction by travelling unit 18. Ripper apparatus 11 is driven by tilt cylinders 15 and a lift cylinder 16.

A ripper arm 14 is provided below tilt cylinders 15 and lift cylinder 16. One end of ripper arm 14 is rotatably attached to vehicle main body 2. To other end of ripper arm 14, a beam 17 is attached so as to be rotatable with respect to ripper arm 14. Shank 12 is rotatably provided about beam 17 with respect to ripper arm 14.

On a front side of vehicle main body 2, an engine compartment 7 is disposed. An internal combustion engine, which is a driving source of the vehicle, is disposed in engine compartment 7.

Power generated by the internal combustion engine is transmitted to drive wheels 10 via a drive train in vehicle main body 2. Crawler belts 9 are driven by rotation of drive wheels 10, and crawler dozer 1 travels. The power of the internal combustion engine is also transferred to a hydraulic pump. The hydraulic pump supplies pressurized oil to respective actuators such as: tilt cylinders 5 and lift cylinder 6, which drive excavating blade 3; and tilt cylinders 15 and lift cylinder 16, which drive ripper apparatus 11.

Antennae (not shown) are provided above engine compartment 7. The antennae include a communication antenna and a global navigation satellite system (GNSS) antenna. A communication device is also mounted on vehicle main body 2. The communication device includes the above-mentioned communication antenna and the controller. The communication antenna receives a command signal transmitted from a remote place. Based on the received command signal, the controller controls the internal combustion engine, the work implements (excavating blade 3 and ripper apparatus 11), travelling unit 18, and the like. The communication device also transmits a signal, which includes information of crawler dozer 1, to a remote place. Crawler dozer 1 includes a camera, a positioning device, and the like, which will be described later. The communication device transmits a video signal of an image of a periphery of crawler dozer 1, an information signal including position information of the vehicle and topography information, and the like to the remote place.

A fuel tank 8 is disposed on a rear side of vehicle main body 2. Fuel tank 8 stores therein fuel to be supplied to the internal combustion engine. Crawler dozer 1 does not include the operator's compartment for allowing the operator to get thereinto, and it is unnecessary to consider rearward visibility when the operator gets thereinto. Therefore, fuel tank 8 extends to the upper surface of vehicle main body 2 in the vertical direction. An upper surface 8a of fuel tank 8 composes the upper surface of vehicle main body 2. Thus, since a capacity of fuel tank 8 is increased, crawler dozer 1 is made capable of continuing the work for a longer time.

A horn 20 is provided at a front end of vehicle main body 2. As shown in FIG. 2, horn 20 has a right column portion 21 and a left column portion 22. Right column portion 21 is disposed to right from a center in the left/right direction of vehicle main body 2, and extends in the substantially vertical direction. Left column portion 22 is disposed to left from the center in the left/right direction of vehicle main body 2, and extends in the substantially vertical direction.

Horn 20 includes a canopy 23 and a shelf portion 24. Canopy 23 and shelf portion 24 have a flat plate shape, and are disposed in parallel to each other with a space in the vertical direction. Canopy 23 is disposed above shelf portion 24. A longitudinal direction of canopy 23 and shelf portion 24 extends in the left/right direction. Right ends of canopy 23 and shelf portion 24 are connected to right column portion 21. Left ends of canopy 23 and shelf portion 24 are connected to left column portion 22.

A right ripper side camera 61 and a left ripper side camera 62 are attached to a lower end portion of a rear surface of vehicle main body 2.

Right ripper side camera 61 is disposed away from a center in the left/right direction of vehicle main body 2. Right ripper side camera 61 is disposed to the right from the center in the left/right direction of vehicle main body 2. Right ripper side camera 61 is disposed at a boundary portion of the rear surface of vehicle main body 2 with a right side surface of vehicle main body 2.

Left ripper side camera 62 is disposed away from the center in the left/right direction of vehicle main body 2. Left ripper side camera 62 is disposed to the left from the center in the left/right direction of vehicle main body 2. Left ripper side camera 62 is disposed at a boundary portion of the rear surface of vehicle main body 2 with a left side surface of vehicle main body 2.

As shown in FIG. 3, right ripper side camera 61 is disposed obliquely right forward of ripper apparatus 11 when viewed from above. Right ripper side camera 61 is disposed obliquely right forward of ripping tip 13 when viewed from above. Left ripper side camera 62 is disposed obliquely left forward of ripper apparatus 11 when viewed from above. Left ripper side camera 62 is disposed obliquely left forward of ripping tip 13 when viewed from above.

In FIG. 3, outer shapes of crawler belts 9 when viewed from above are indicated by broken lines. Moreover, in FIG. 3, right ripper side camera 61 and left ripper side camera 62 are indicated by broken lines. As shown in FIG. 3, right ripper side camera 61 and left ripper side camera 62 are disposed at positions which do not overlap with crawler belts 9 when viewed from above. Right ripper side camera 61 and left ripper side camera 62 are disposed within width ranges of crawler belts 9 in the left/right direction of vehicle main body 2 (see also FIG. 2). As shown in FIG. 2, right ripper side camera 61 and left ripper side camera 62 are disposed above upper ends of crawler belts 9.

Figure 4:
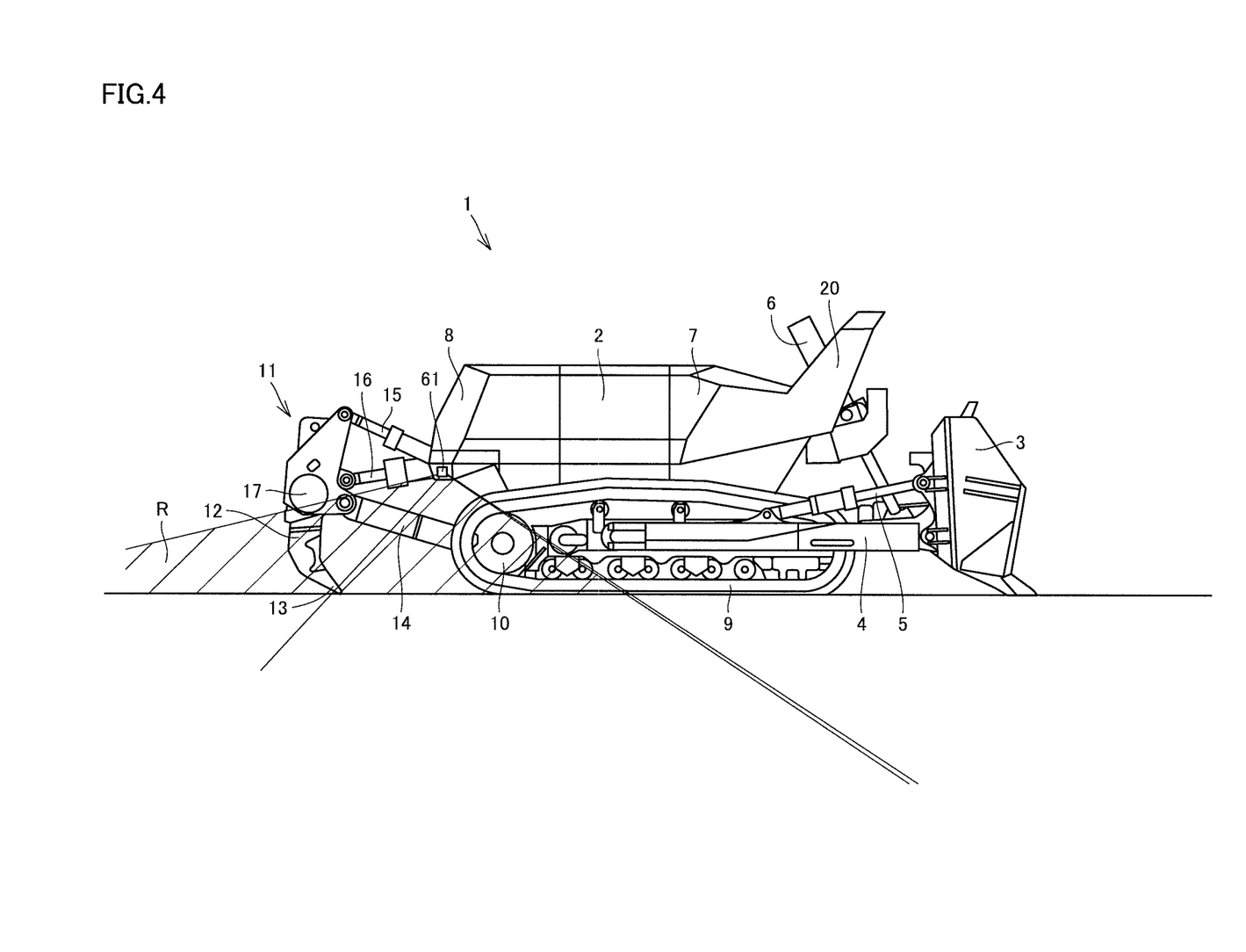
FIG. 4 is a schematic diagram showing an imaging range by a right ripper side camera when viewed from a right side of the crawler dozer.
Figure 5:
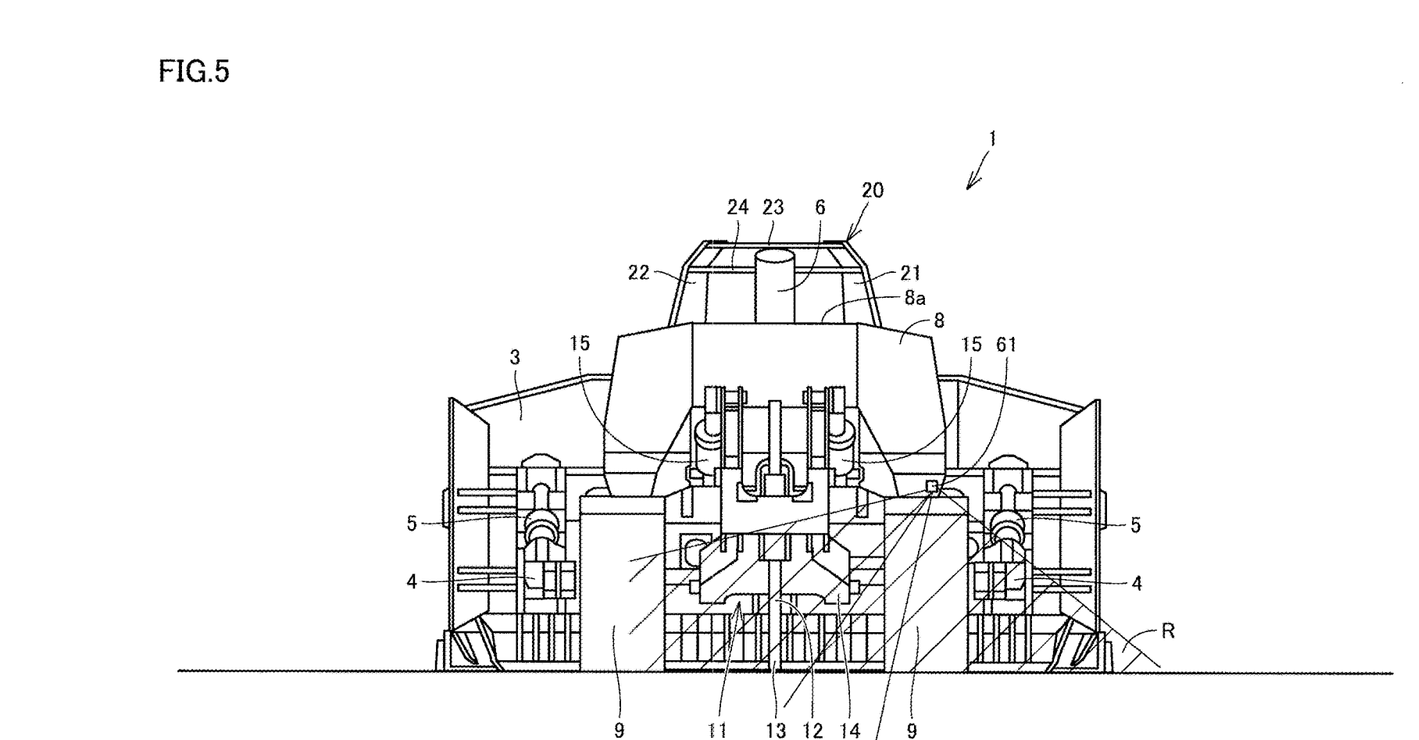
FIG. 5 is a schematic diagram showing an imaging range by the right ripper side camera when viewed from behind the crawler dozer.

FIG. 4 is a schematic diagram showing an imaging range R by right ripper side camera 61 when viewed from a right side of crawler dozer 1. FIG. 5 is a schematic diagram showing imaging range R by right ripper side camera 61 when viewed from behind crawler dozer 1. In FIGS. 4 and 5, hatching, which extends from upper right to lower left, is applied to imaging range R by right ripper side camera 61, and the applied hatching is illustrated.

An optical axis of right ripper side camera 61 extends obliquely downward from right ripper side camera 61. Right ripper side camera 61 is disposed to face obliquely left downward so as to be able to image ripper apparatus 11. Imaging range R by right ripper side camera 61 has a shape of a regular quadrangular pyramid with right ripper side camera 61 as the vertex. Four lines, which are shown in each of FIGS. 4 and 5 and extend obliquely from right ripper side camera 61, indicate oblique sides of the regular quadrangular pyramid.

As shown in FIGS. 4 and 5, ripping tip 13 is included in imaging range R by right ripper side camera 61. Right ripper side camera 61 is capable of imaging ripping tip 13. In addition, a part of right crawler belt 9 is included in imaging range R by right ripper side camera 61. Right ripper side camera 61 is capable of simultaneously imaging ripping tip 13 and a part of right crawler belt 9. Right ripper side camera 61 has a function as an imaging unit of this embodiment.

Left ripper side camera 62 is disposed in plane symmetry with right ripper side camera 61 with respect to a plane that passes through the center in the left/right direction of vehicle main body 2 and extends in the vertical direction. Therefore, although not shown, an imaging range by left ripper side camera 62 includes ripping tip 13 and a part of left crawler belt 9 in a similar way. Left ripper side camera 62 is capable of simultaneously imaging ripping tip 13 and a part of left crawler belt 9.

Figure 6:
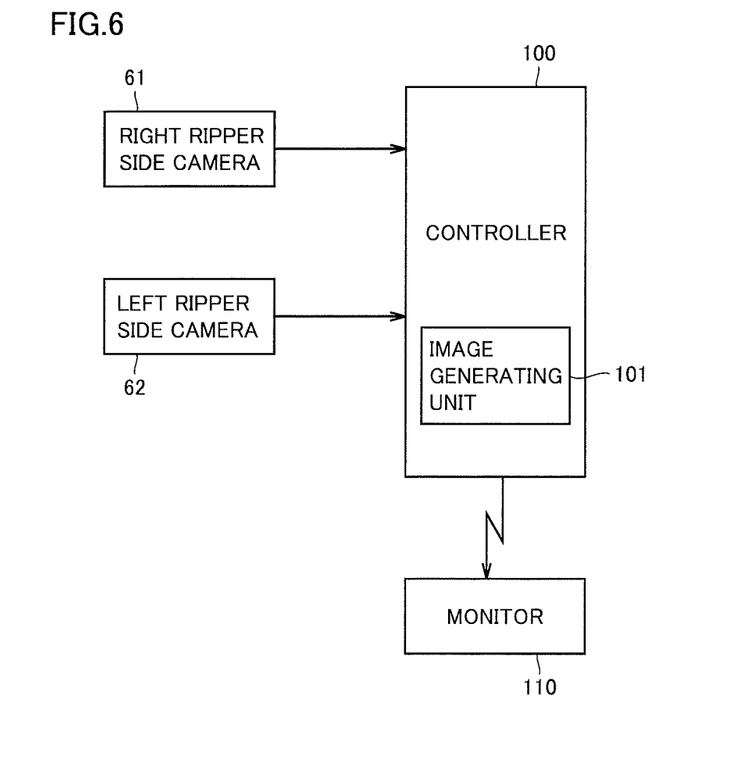
FIG. 6 is a functional block diagram schematically showing a construction of a display system.

FIG. 6 is a functional block diagram schematically showing a configuration of the display system. As shown in FIG. 6, right ripper side camera 61 and left ripper side camera 62 are electrically connected to a controller 100. Controller 100 is mounted on crawler dozer 1. Controller 100 composes the above-mentioned communication device, and controls the internal combustion engine, the work implements (excavating blade 3 and ripper apparatus 11), travelling unit 18, and the like.

Controller 100 includes an image generating unit 101. Image generating unit 101 generates a display image based on an image captured by right ripper side camera 61 and/or an image captured by left ripper side camera 62.

Controller 100 transmits the display image, which is generated by image generating unit 101, to a remote place by using the communication device mentioned above. The remote place is located at a location distant from a work site where crawler dozer 1 is working, and a monitor 110 is provided there. The display image generated by image generating unit 101 is displayed on monitor 110. The image captured by right ripper side camera 61 is displayed on monitor 110. Monitor 110 has a function as a display unit in this embodiment, which displays a display image.

Figure 7:
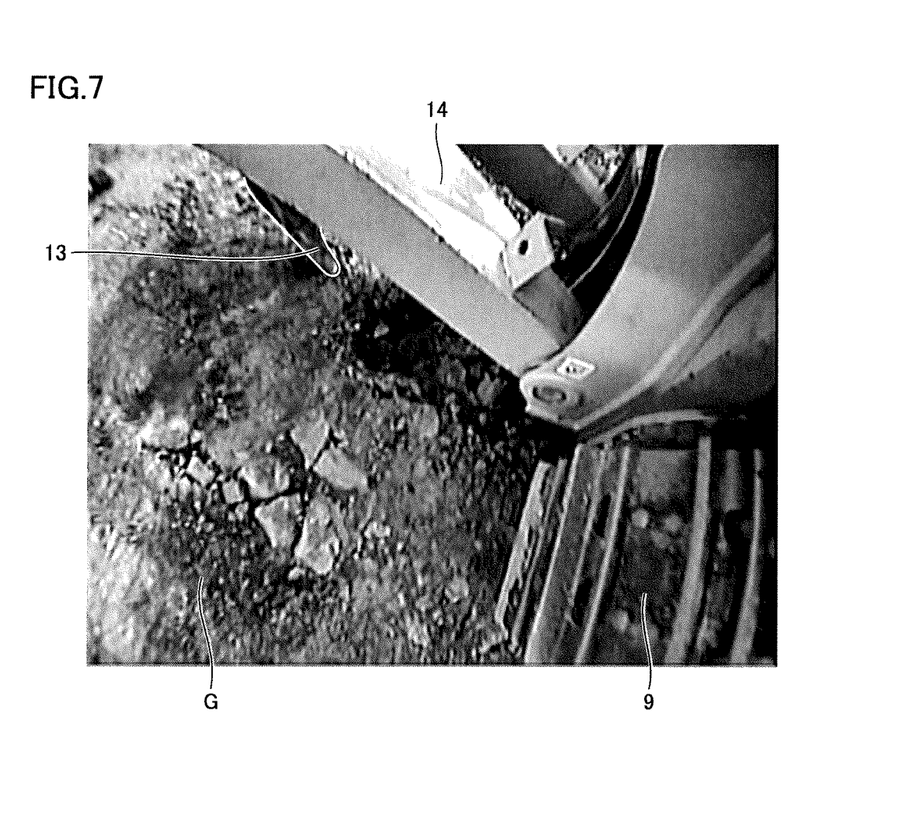
FIG. 7 is a schematic diagram showing an example of a display image displayed on a monitor.

FIG. 7 is a schematic diagram showing an example of the display image displayed on monitor 110. The display image shown in FIG. 7 includes: ripping tip 13; a part of ripper arm 14; a rear end portion of right crawler belt 9; and a ground G behind right crawler belt 9 and on the right side of ripper arm 14. The display image includes ripping tip 13 captured from an oblique direction and a part of crawler belt 9. By viewing the display image shown in FIG. 7, the operator can confirm ripping tip 13 and a part of crawler belt 9 simultaneously.

A function and effect of this embodiment will now be described.

The display system of this embodiment is a system for displaying information related to the work vehicle. As shown in FIGS. 1 to 3, crawler dozer 1 as an example of the work vehicle includes: travelling unit 18 having crawler belts 9; vehicle main body 2 installed on travelling unit 18; and ripper apparatus 11 having ripping tip 13 and disposed behind vehicle main body 2. As shown in FIG. 6, the display system includes right ripper side camera 61, image generating unit 101 and monitor 110.

As shown in FIG. 3, right ripper side camera 61 is mounted on vehicle main body 2. Right ripper side camera 61 is disposed obliquely right forward of ripping tip 13 when viewed from above. As shown in FIGS. 4 and 5, imaging range R of right ripper side camera 61 covers ripping tip 13 and a part of crawler belt 9, and right ripper side camera 61 simultaneously images ripping tip 13 and a part of crawler belt 9. Image generating unit 101 generates a display image. As shown in FIG. 7, the display image includes the image of ripping tip 13 by right ripper side camera 61 and the image of a part of crawler belt 9 by right ripper side camera 61. Monitor 110 displays the display image.

Since ripping tip 13 is captured from the oblique direction, it is easy for the operator who views monitor 110 to accurately grasp a position of ripping tip 13 and a topography below ripping tip 13. This makes it easy to ground ripping tip 13 to a target point on ground G during ripping work. Hence, the appropriate ripping work can be performed with ease.

Since a part of crawler belt 9 and ground G are displayed on the display image, the operator can determine whether or not crawler belt 9 clips relative to ground G, that is, whether or not track shoe slippage occurs, by seeing monitor 110. It can be said that information about a rotative running of crawler belt 9 is displayed on the display image. The operator who visually confirms an occurrence of the track shoe slippage can perform the operation of decreasing a rotation speed of the internal combustion engine so as to get out of the track shoe slippage state. By minimizing the track shoe slippage, a power loss of the internal combustion engine is reduced, and appropriate driving force can be given to ripper apparatus 11. Hence, the appropriate ripping work can be performed. In addition, fuel consumption of crawler dozer 1 can be improved, and wear of crawler belts 9 can be reduced.

Since right ripper side camera 61 is mounted on vehicle main body 2, relative positions of right ripper side camera 61 with respect to ripping tip 13 and crawler belt 9 are invariant during the traveling of crawler dozer 1. Therefore, imaging range R of right ripper side camera 61 can always cover ripping tip 13 and a part of crawler belt 9. Hence, ripping tip 13 and a part of crawler belt 9 can be captured reliably and simultaneously by right ripper side camera 61.

Moreover, as shown in FIG. 3, right ripper side camera 61 is disposed at the position which does not overlap with crawler belt 9 when viewed from above. If right ripper side camera 61 is disposed immediately above crawler belt 9, then soil and mud may be bounced up when crawler dozer 1 travels, and right ripper side camera 61 may be covered with soil to be incapable of capturing an image. Right ripper side camera 61 is disposed avoiding a position immediately above crawler belt 9, and is disposed at the position which does not overlap with crawler belt 9 when viewed from above, whereby contamination of right ripper side camera 61 due to soil or mud can be suppressed. Hence, ripping tip 13 can be captured reliably by right ripper side camera 61.

As shown in FIG. 3, right ripper side camera 61 is disposed within the width range of crawler belt 9 in the left/right direction of vehicle main body 2. Ripping tip 13 of ripper apparatus 11 changes a position thereof according to the extension and contraction of tilt cylinders 15 and lift cylinder 16. If right ripper side camera 61 is disposed too close to ripping tip 13, ripping tip 13 may move out of imaging range R of right ripper side camera 61 when ripping tip 13 changes the position. Right ripper side camera 61 is disposed at a position away from ripping tip 13 in the left/right direction of vehicle main body 2 and is disposed within the width range of crawler belt 9 in the left/right direction of vehicle main body 2, then imaging range R can cover a moving range of ripping tip 13. Hence, ripping tip 13 can be captured reliably by right ripper side camera 61.

It should be noted that right ripper side camera 61 needs to be able to image ripping tip 13 in contact with the ground so that at least the situation of the ripping work can be confirmed. More preferably, right ripper side camera 61 may image ripping tip 13 when ripping tip 13 is most distant from the ground. Right ripper side camera 61 may always image ripping tip 13 even if ripping tip 13 changes the position thereof. In this case, regardless of the position of ripping tip 13, the operator who views monitor 110 can always visually recognize ripping tip 13.

As shown in FIG. 2, right ripper side camera 61 is disposed above the upper end of crawler belt 9. In this way, a part of crawler belt 9 can be reliably contained within imaging range R of right ripper side camera 61. Hence, right ripper side camera 61 can image ripping tip 13 and a part of crawler belt 9 reliably and simultaneously.

In the description above, the example has been described, in which right ripper side camera 61 simultaneously images both of ripping tip 13 and a part of crawler belt 9, the display image includes both of ripping tip 13 and crawler belt 9, and both of ripping tip 13 and crawler belt 9 are displayed on monitor 110. The display system of this embodiment is not limited to this example. Right ripper side camera 61 may image ripping tip 13 and ground G without imaging crawler belt 9. Crawler belt 9 does not need to be present within imaging range R of right ripper side camera 61.

Figure 8:
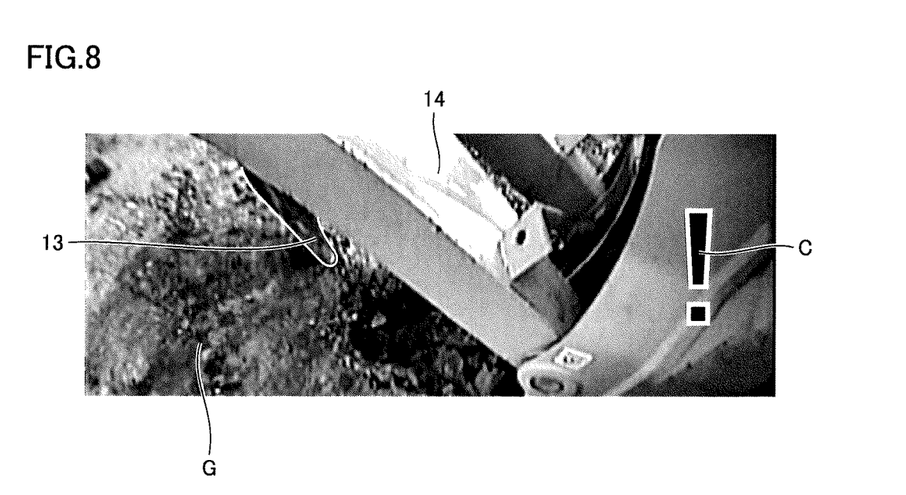
FIG. 8 is a schematic diagram showing an example of a display image displayed on the monitor.

In this case, image generating unit 101 of controller 100 may generate a display image including the image of ripping tip 13 by right ripper side camera 61 and the occurrence situation of the track shoe slippage. For example, while the track shoe slippage is not occurring, only the image captured by right ripper side camera 61 may be displayed on monitor 110, and when it is determined that the track shoe slippage has occurred, a warning or a message may be displayed on monitor 110 in addition to the image captured by right ripper side camera 61. As shown in FIG. 8, an exclamation mark C may be displayed in the display image. The display of exclamation mark C corresponds to the information about a rotative running of crawler belt 9. Note that FIG. 8 is a schematic diagram showing an example of a display image displayed on monitor 110, which is different from the example shown in FIG. 7.

In this way, the operator can accurately grasp the position of ripping tip 13 with respect to ground G by seeing monitor 110 that displays the display image, and can determine whether or not the track shoe slippage has occurred. Hence, the appropriate ripping work can be performed with ease.

The occurrence situation of the track shoe slippage can be determined, for example, by comparing a speed of vehicle main body 2 and a rotational speed given to drive wheels 10. As mentioned above, crawler belts 9 are driven by the rotation of drive wheels 10, and crawler dozer 1 travels. When the speed of vehicle main body 2, which corresponds to the rotational speed given to drive wheels 10, is not obtained, then it can be determined that crawler belt 9 slides against the ground and crawler belt 9 slips, and that the track shoe slippage has occurred.

Monitor 110 that displays the display image does not need to be located at a remote place away from the work site on which crawler dozer 1 is working. For example, in the crawler dozer including an operator's compartment which the operator gets into, monitor 110 of this embodiment may be disposed in the operator's compartment. The display system of this embodiment is not applied only to an unmanned work vehicle for remote control but may also be applied to a manned work vehicle operated by the operator who gets thereinto.

Although the embodiment of the present invention has been described above, it should be understood that the embodiment disclosed herein is illustrative and non-restrictive in every respect. The scope of the present invention is defined by the terms of the claims, and is intended to include any modifications within the scope and meaning equivalent to the terms of the claims.

REFERENCE SIGNS LIST

1: crawler dozer, 2: vehicle main body, 3: excavating blade, 4: frame, 5, 15: tilt cylinder, 6, 16: lift cylinder, 7: engine compartment, 8: fuel tank, 8a: upper surface, 9: crawler belt, 10: drive wheel, 11: ripper apparatus, 12: shank, 13: ripping tip, 14: ripper arm, 17: beam, 18: travelling unit, 20: horn, 21: right column portion, 22: left column portion, 23: canopy, 24: shelf portion, 61: right ripper side camera, 62: left ripper side camera, 100: controller, 101: image generating unit, 110: monitor, C: exclamation mark, G: ground, R: imaging range.

The invention claimed is:

1. A display system for displaying information related to a work vehicle, which includes a travelling unit having a crawler belt, a vehicle main body installed on the travelling unit, and a ripper apparatus having a ripping tip and disposed behind the vehicle main body, the display system comprising:
an imaging unit imaging the ripping tip, the imaging unit being mounted on the vehicle main body;
an image generating unit generating a display image including an image of the ripping tip by the imaging unit and information about a rotative running of the crawler belt; and
a display unit displaying the display image,
wherein the imaging unit is disposed at a position which does not overlap with the crawler belt when viewed from above.

2. The display system according to claim 1, wherein the imaging unit is disposed obliquely forward of the ripping tip when viewed from above, and simultaneously images the ripping tip and a part of the crawler belt.

3. The display system according to claim 1, wherein the imaging unit is disposed within a width range of the crawler belt in a left/right direction of the vehicle main body.

4. The display system according to claim 1, wherein the imaging unit is disposed above an upper end of the crawler belt.

* * * * *